(12) United States Patent
Mack et al.

(10) Patent No.: US 10,985,380 B2
(45) Date of Patent: *Apr. 20, 2021

(54) BATTERY AND BATTERY PLATE ASSEMBLY WITH HIGHLY ABSORBENT SEPARATOR

(71) Applicant: CPS Technology Holdings LLC, New York, NY (US)

(72) Inventors: Robert J. Mack, Milwaukee, WI (US); Jeffrey L. Troxel, Menomonee Falls, WI (US)

(73) Assignee: CPS Technology Holdings LLC, New York, NY (US)

( * ) Notice: Subject to any disclaimer, the term of this patent is extended or adjusted under 35 U.S.C. 154(b) by 87 days.

This patent is subject to a terminal disclaimer.

(21) Appl. No.: 15/661,741

(22) Filed: Jul. 27, 2017

(65) Prior Publication Data

US 2017/0324098 A1  Nov. 9, 2017

Related U.S. Application Data

(63) Continuation of application No. 14/068,511, filed on Oct. 31, 2013, now Pat. No. 9,748,578, which is a
(Continued)

(51) Int. Cl.
*H01M 4/73* (2006.01)
*H01M 4/14* (2006.01)
(Continued)

(52) U.S. Cl.
CPC .............. *H01M 4/73* (2013.01); *H01M 4/14* (2013.01); *H01M 10/12* (2013.01);
(Continued)

(58) Field of Classification Search
None
See application file for complete search history.

(56) References Cited

U.S. PATENT DOCUMENTS

| 345,511 A | 7/1886 | Khotinsky |
| 487,834 A | 12/1892 | Griscom |

(Continued)

FOREIGN PATENT DOCUMENTS

| CN | 101340007 A | 1/2009 |
| CN | 101499541 A | 8/2009 |

(Continued)

OTHER PUBLICATIONS

Patent Abstract for AU 275685.
(Continued)

*Primary Examiner* — Lucas J. O'Donnell
(74) *Attorney, Agent, or Firm* — Boardman & Clark LLP (57) ABSTRACT

A battery plate assembly for a lead-acid battery is disclosed. The assembly includes a plates of opposing polarity each formed by an electrically conductive grid body having opposed top and bottom frame elements and opposed first and second side frame elements, the top frame element having a lug and an opposing enlarged conductive section extending toward the bottom frame element; a plurality of interconnecting electrically conductive grid elements defining a grid pattern defining a plurality of open areas, the grid elements including a plurality of radially extending vertical grid, wire elements connected to the top frame element, and a plurality of horizontally extending grid wire elements, the grid body having an active material provided thereon. A highly absorbent separator is wrapped around at least a portion of the plate of a first polarity and extends to opposing plate faces. An electrolyte is provided, wherein substantially all of the electrolyte is absorbed by the separator or active material. A method for assembling a battery is also disclosed.

7 Claims, 7 Drawing Sheets

FIG. 4

Related U.S. Application Data continuation-in-part of application No. 13/641,035, filed as application No. PCT/US2011/032498 on Apr. 14, 2011, now Pat. No. 8,586,248.

(60) Provisional application No. 61/323,988, filed on Apr. 14, 2010.

(51) Int. Cl.
*H01M 10/12* (2006.01)
*H01M 50/44* (2021.01)
*H01M 50/431* (2021.01)
*H01M 50/46* (2021.01)

(52) U.S. Cl.
CPC ......... *H01M 50/431* (2021.01); *H01M 50/44* (2021.01); *H01M 50/46* (2021.01)

(56) References Cited

U.S. PATENT DOCUMENTS

| | | |
|---|---|---|
| 669,085 A | 3/1901 | Heidel |
| 1,129,690 A | 2/1915 | Knobloch |
| 1,500,219 A | 7/1924 | Benner |
| 1,524,610 A | 1/1925 | Ahlgren |
| 1,528,963 A | 3/1925 | Adams et al. |
| 1,600,083 A | 9/1926 | Webster |
| 1,675,644 A | 7/1928 | Reginald et al. |
| 1,947,473 A | 2/1934 | Huebner |
| 1,983,611 A | 12/1934 | Jackson |
| 2,060,534 A | 11/1936 | Singleton et al. |
| 2,079,727 A | 5/1937 | Wirtz |
| 2,148,371 A | 2/1939 | Galloway |
| 2,193,782 A | 3/1940 | Smith |
| 2,261,053 A | 10/1941 | De Martis et al. |
| 2,282,760 A | 5/1942 | Hauel |
| 2,882,760 A | 5/1942 | Haud |
| 2,503,970 A | 4/1950 | Rupp |
| 2,727,079 A | 12/1955 | Chubb et al. |
| 2,821,565 A | 1/1958 | Lander et al. |
| 2,881,105 A | 4/1959 | Gullett |
| 2,882,568 A | 4/1959 | Leaberry et al. |
| 3,009,459 A | 11/1961 | Ruben |
| 3,023,468 A | 3/1962 | Hord et al. |
| 3,249,981 A | 5/1966 | Sabatino |
| 3,349,067 A | 10/1967 | Hill et al. |
| 3,398,024 A | 8/1968 | Barnes et al. |
| 3,408,236 A | 10/1968 | Hartesveldt |
| 3,466,193 A | 9/1969 | Hughel |
| 3,486,942 A | 12/1969 | Hatterschide |
| 3,534,803 A | 10/1970 | Bickerdike et al. |
| 3,556,853 A | 1/1971 | Cannone |
| 3,556,854 A | 1/1971 | Wheadon et al. |
| 3,579,386 A | 5/1971 | Tiegel et al. |
| 3,629,388 A | 12/1971 | Wolf et al. |
| 3,710,430 A | 1/1973 | Long et al. |
| 3,723,181 A | 3/1973 | Oakley |
| 3,761,047 A | 9/1973 | Mao |
| 3,779,816 A | 12/1973 | Mao |
| 3,853,626 A | 12/1974 | Daniels et al. |
| 3,862,861 A | 1/1975 | McClelland |
| 3,909,293 A | 9/1975 | Hammond et al. |
| 3,923,545 A | 12/1975 | Margulies et al. |
| 3,926,247 A | 12/1975 | Geiger |
| 3,929,513 A | 12/1975 | Mao |
| 3,933,335 A | 1/1976 | Maruyama et al. |
| 3,933,524 A | 1/1976 | Hughel et al. |
| 3,945,097 A | 3/1976 | Daniels, Jr. et al. |
| 3,947,936 A | 4/1976 | Wheadon |
| 3,959,016 A | 5/1976 | Tsuda |
| 3,989,539 A | 11/1976 | Grabb |
| 4,016,633 A | 4/1977 | Smith et al. |
| 4,022,951 A | 5/1977 | McDowall |
| 4,029,855 A | 6/1977 | Dougherty et al. |
| 4,048,397 A | 9/1977 | Rothbauer |
| 4,050,502 A | 9/1977 | Allyn et al. |
| 4,080,727 A | 3/1978 | Stolle et al. |
| 4,097,625 A | 6/1978 | Lunn et al. |
| 4,107,407 A | 8/1978 | Koch |
| 4,118,553 A | 10/1978 | Buckethal et al. |
| 4,140,840 A | 2/1979 | Ruben |
| 4,151,331 A | 4/1979 | Hug et al. |
| 4,159,908 A | 7/1979 | Rao et al. |
| 4,189,533 A | 2/1980 | Sugalski |
| 4,196,757 A | 4/1980 | Hug et al. |
| 4,196,769 A | 4/1980 | Feagin |
| 4,199,849 A | 4/1980 | Moreau |
| 4,221,032 A | 9/1980 | Cousino et al. |
| 4,221,852 A | 9/1980 | Qureshi |
| 4,291,443 A | 9/1981 | Laurie et al. |
| 4,297,866 A | 11/1981 | Sakauye et al. |
| 4,303,747 A | 12/1981 | Bender |
| 4,305,187 A | 12/1981 | Iwamura et al. |
| 4,315,356 A | 2/1982 | Laurie et al. |
| 4,315,829 A | 2/1982 | Duddy et al. |
| 4,317,351 A | 3/1982 | Borrows |
| 4,320,183 A | 3/1982 | Qureshi |
| 4,327,163 A | 4/1982 | Wheadon |
| 4,336,314 A | 6/1982 | Yonezu et al. |
| 4,345,452 A | 8/1982 | Eberle |
| 4,349,067 A | 9/1982 | Wirtz et al. |
| 4,351,891 A | 9/1982 | McCartney, Jr. et al. |
| 4,353,969 A | 10/1982 | Rippel et al. |
| 4,358,892 A | 11/1982 | Turillon et al. |
| 4,386,987 A | 6/1983 | Covitch et al. |
| 4,407,063 A | 10/1983 | Johnson |
| 4,443,918 A | 4/1984 | Morinari et al. |
| 4,455,724 A | 6/1984 | Sperling et al. |
| 4,460,666 A | 7/1984 | Dinkler et al. |
| 4,462,745 A | 7/1984 | Johnson et al. |
| 4,477,546 A | 10/1984 | Wheeler et al. |
| 4,498,519 A | 2/1985 | Watanabe et al. |
| 4,528,255 A | 7/1985 | Hayes et al. |
| 4,548,882 A | 10/1985 | Shima et al. |
| 4,555,459 A | 11/1985 | Anderson et al. |
| 4,606,383 A | 8/1986 | Yanik |
| 4,606,982 A | 8/1986 | Nelson et al. |
| 4,614,630 A | 9/1986 | Pluim, Jr. |
| 4,629,516 A | 12/1986 | Myers |
| 4,648,177 A | 3/1987 | Uba |
| 4,683,180 A | 7/1987 | Bish et al. |
| 4,758,126 A | 7/1988 | Johnson et al. |
| 4,761,352 A | 8/1988 | Bakos et al. |
| 4,761,356 A | 8/1988 | Kobayashi et al. |
| 4,782,585 A | 11/1988 | Kobayashi et al. |
| 4,805,277 A | 2/1989 | Yasuda et al. |
| 4,822,234 A | 4/1989 | Johnson et al. |
| 4,824,307 A | 4/1989 | Johnson et al. |
| 4,830,938 A | 5/1989 | McCullough et al. |
| 4,865,928 A | 9/1989 | Richter |
| 4,865,933 A | 9/1989 | Blanyer et al. |
| 4,882,234 A | 11/1989 | Lai et al. |
| 4,882,828 A | 11/1989 | McLoughlin et al. |
| 4,906,540 A | 3/1990 | Hoshihara et al. |
| 4,939,051 A | 7/1990 | Yasuda et al. |
| 4,982,482 A | 1/1991 | Wheadon et al. |
| 5,017,446 A | 5/1991 | Reichman et al. |
| 5,024,908 A | 6/1991 | Terada et al. |
| 5,093,970 A | 3/1992 | Senoo et al. |
| 5,098,799 A | 3/1992 | Bowen et al. |
| 5,149,605 A | 9/1992 | Dougherty |
| 5,221,852 A | 6/1993 | Nagai et al. |
| 5,223,354 A | 6/1993 | Senoo et al. |
| 5,264,306 A | 11/1993 | Walker, Jr. et al. |
| 5,273,554 A | 12/1993 | Vyas |
| 5,308,719 A | 5/1994 | Mrotek et al. |
| 5,344,727 A | 9/1994 | Meadows et al. |
| 5,350,645 A | 9/1994 | Lake et al. |
| 5,384,217 A | 1/1995 | Binder et al. |
| 5,384,219 A | 1/1995 | Dao et al. |
| 5,434,025 A | 7/1995 | Rao et al. |
| 5,462,109 A | 10/1995 | Vincze |
| 5,506,062 A | 4/1996 | Flammang |
| 5,527,642 A | 6/1996 | Meadows et al. |

(56) References Cited

U.S. PATENT DOCUMENTS

| | | | |
|---|---|---|---|
| 5,540,127 A | 7/1996 | Binder et al. | |
| 5,543,250 A | 8/1996 | Yanagihara et al. | |
| 5,578,398 A | 11/1996 | Jenkins et al. | |
| 5,578,840 A | 11/1996 | Scepanovic et al. | |
| 5,580,685 A | 12/1996 | Schenk | |
| 5,582,936 A | 12/1996 | Mrotek et al. | |
| 5,595,840 A | 1/1997 | Henning et al. | |
| 5,601,953 A | 2/1997 | Schenk | |
| 5,611,128 A | 3/1997 | Wirtz | |
| 5,643,696 A | 7/1997 | Rowlette | |
| 5,660,600 A | 8/1997 | Vyas | |
| 5,660,946 A | 8/1997 | Kump et al. | |
| 5,691,087 A | 11/1997 | Rao et al. | |
| 5,834,141 A | 11/1998 | Anderson et al. | |
| 5,851,695 A | 12/1998 | Misra et al. | |
| 5,858,575 A | 1/1999 | Chen | |
| 5,874,186 A | 2/1999 | Rao et al. | |
| 5,948,566 A | 9/1999 | Larsen et al. | |
| 5,952,123 A | 9/1999 | Hatanaka et al. | |
| 5,958,274 A | 9/1999 | Dobie et al. | |
| 5,958,625 A | 9/1999 | Rao | |
| 5,989,749 A | 11/1999 | Kao et al. | |
| 6,037,081 A | 3/2000 | Kashio et al. | |
| 6,057,059 A | 5/2000 | Kwok et al. | |
| 6,086,691 A | 7/2000 | Lehockey et al. | |
| 6,117,594 A | 9/2000 | Taylor et al. | |
| 6,122,820 A | 9/2000 | Dawood et al. | |
| 6,153,335 A | 11/2000 | Vutetakis | |
| 6,180,286 B1 | 1/2001 | Rao et al. | |
| 6,203,948 B1 | 3/2001 | Kao et al. | |
| 6,245,462 B1 | 6/2001 | Kao et al. | |
| 6,267,923 B1 | 7/2001 | Albert et al. | |
| 6,274,274 B1 | 8/2001 | Schaeffer et al. | |
| 6,291,097 B1 | 9/2001 | Barker et al. | |
| 6,291,104 B1 | 9/2001 | Yoshihara et al. | |
| 6,312,852 B1 | 11/2001 | Wagner | |
| 6,342,110 B1 | 1/2002 | Palumbo | |
| 6,351,878 B1 | 3/2002 | Rao | |
| RE37,804 E | 7/2002 | Mattan | |
| 6,419,712 B1 | 7/2002 | Haverstick | |
| 6,442,811 B1 | 9/2002 | Dawood et al. | |
| 6,444,366 B1 | 9/2002 | Kawano et al. | |
| 6,454,977 B1 | 9/2002 | Kwok et al. | |
| 6,468,318 B1 | 10/2002 | Meadows et al. | |
| 6,582,855 B1 | 6/2003 | Miyamoto et al. | |
| 6,592,686 B2 | 7/2003 | Palumbo | |
| 6,649,306 B2 | 11/2003 | Prengaman | |
| 6,749,950 B2 | 6/2004 | Zhang | |
| 6,755,874 B2 | 6/2004 | Chen et al. | |
| 6,797,403 B2 | 9/2004 | Clark et al. | |
| 6,833,218 B2 | 12/2004 | Mann | |
| 6,921,611 B2 | 7/2005 | Schaeffer et al. | |
| 6,953,641 B2 | 10/2005 | Chen | |
| 7,398,581 B2 | 7/2008 | Chen | |
| 7,767,347 B2 | 8/2010 | Kao et al. | |
| 7,799,463 B2 | 9/2010 | Schaeffer et al. | |
| 8,586,248 B2 | 11/2013 | Mack et al. | |
| 9,748,578 B2 | 8/2017 | Mack et al. | |
| 2002/0088515 A1 | 7/2002 | Aust et al. | |
| 2003/0059674 A1 | 3/2003 | Mann et al. | |
| 2004/0033157 A1 | 2/2004 | Schaeffer | |
| 2004/0187986 A1 | 9/2004 | Schaeffer | |
| 2005/0112470 A1 | 5/2005 | Taylor et al. | |
| 2005/0150092 A1 | 7/2005 | Chen | |
| 2005/0164091 A1 | 7/2005 | Schaeffer et al. | |
| 2006/0096079 A1 | 5/2006 | Farina | |
| 2008/0131763 A1 | 6/2008 | Buiel et al. | |
| 2009/0291359 A1 | 11/2009 | Wirtz et al. | |

FOREIGN PATENT DOCUMENTS

| | | |
|---|---|---|
| CN | 101626085 A | 1/2010 |
| DE | 2528688 | 1/1977 |
| DE | 2528688 A1 | 1/1977 |
| DE | 3045683 | 6/1982 |
| DE | 3045683 A1 | 6/1982 |
| EP | 0029788 | 11/1980 |
| EP | 0065996 | 5/1981 |
| EP | 0348702 | 1/1990 |
| EP | 0589549 | 3/1994 |
| EP | 0795917 A2 | 9/1997 |
| EP | 0969108 | 1/2000 |
| EP | 1041164 | 10/2000 |
| EP | 1628354 | 2/2006 |
| GB | 570953 | 7/1945 |
| GB | 1377039 | 5/1973 |
| GB | 2127614 A | 7/1983 |
| GB | 2170343 | 7/1986 |
| JP | 50028638 | 3/1975 |
| JP | 55046267 | 3/1980 |
| JP | 55130076 | 10/1980 |
| JP | 55144659 | 11/1980 |
| JP | 56032678 | 4/1981 |
| JP | 56107474 | 8/1981 |
| JP | 56138871 | 10/1981 |
| JP | 56138872 | 10/1981 |
| JP | 56165279 | 12/1981 |
| JP | 56167271 | 12/1981 |
| JP | 57205969 | 12/1982 |
| JP | 58032367 | 2/1983 |
| JP | 58066266 | 4/1983 |
| JP | 58075772 | 5/1983 |
| JP | 59134563 | 8/1984 |
| JP | 60000062 | 1/1985 |
| JP | 60009061 | 1/1985 |
| JP | 60037663 | 2/1985 |
| JP | 60039766 | 3/1985 |
| JP | 60143570 | 7/1985 |
| JP | 60150556 | 8/1985 |
| JP | 60167267 | 8/1985 |
| JP | 60198055 | 10/1985 |
| JP | 61124052 | 6/1986 |
| JP | 63213264 | 9/1988 |
| JP | 1030168 | 2/1989 |
| JP | 2297864 | 12/1990 |
| JP | 3030260 | 2/1991 |
| JP | 3245462 | 11/1991 |
| JP | 5036416 | 2/1993 |
| JP | 5275081 | 10/1993 |
| JP | 07065822 | 3/1995 |
| JP | 8083617 | 3/1996 |
| JP | 8287905 | 11/1996 |
| JP | 10284085 | 10/1998 |
| JP | 11054115 | 2/1999 |
| JP | 11213993 | 8/1999 |
| JP | 2001229920 | 8/2001 |
| JP | 2001229920 A | 8/2001 |
| KR | 1020080033171 A | 4/2008 |
| WO | WO 199927595 | 6/1999 |
| WO | WO 20010104977 | 1/2001 |
| WO | WO 200153549 | 7/2001 |
| WO | WO 200215296 | 2/2002 |
| WO | WO 2002054513 A2 | 7/2002 |
| WO | WO 2006127575 | 11/2006 |

OTHER PUBLICATIONS

S. Goodman "Plates with improved conductivity" Batteries International, pp. 88-89 (no month).
U.S. Appl. No. 09/755,337 titled "Method for Making an Alloy Coated Battery Grid" by Yu-Lin Chen.
Traditional Lead Acid Battery Shortcomings, www.fireflyenergy.com.
Megger, Failure Modes—Lead-acid (flooded) failure modes, Battery Testing Guide, p. 7, Art.nr. ZP-AD01E, Doc. AD0009AE, 00/2009.
Calabek et al., "Influence of grid design on current distribution over the electrode surface in a lead-acid cell," Journal of Power Sources 85 (2000) 145-148.
May et al., "The optimisation of grid designs for valve-regulated lead/acid batteries for hybrid electric vehicle applications," Journal of Power Sources 195 (2010) 4520-4525.

(56) References Cited

OTHER PUBLICATIONS

Ishikawa et al., "A punched grid production process for automotive batteries" from Pb 80, 7th International Conference (1980).
Perez, "The Complete Battery Book" TAB Books, Inc., 191 pp., 1985 (no month).
International Search Report and Written Opinion from the International Searching Authority, dated Sep. 2, 2011, received in connection with PCT/US11/032498 filed Apr. 14, 2011, 8 pgs.

BATTERY AND BATTERY PLATE ASSEMBLY WITH HIGHLY ABSORBENT SEPARATOR

CROSS-REFERENCE TO RELATED APPLICATIONS

This application is a continuation of U.S. patent application Ser. No. 14/068,511 filed Oct. 31, 2013 entitled BATTERY AND BATTERY PLATE ASSEMBLY, now U.S. Pat. No. 9,748,578, which is a continuation of U.S. patent application Ser. No. 13/641,035 filed Oct. 12, 2012 entitled BATTERY, BATTERY PLATE ASSEMBLY, AND METHOD OF ASSEMBLY, now U.S. Pat. No. 8,586,248, which claims priority as a National Phase application of International Patent Application No. PCT/US11/32498 filed Apr. 14, 2011 entitled BATTERY, BATTERY PLATE ASSEMBLY, AND METHOD OF ASSEMBLY, which claims priority to United States Provisional Patent Application, Serial No. 61/323,988, filed Apr. 14, 2010 entitled "Battery," the contents of each of which is incorporated herein by reference in its entirety.

FIELD

The present invention relates to the field of batteries (e.g. lead-acid batteries including batteries for vehicle starting, lighting and ignition applications; marine batteries; commercial batteries; industrial batteries; batteries for use with hybrid-electric vehicles, micro-hybrid vehicles, etc.). The present invention more specifically relates to the internal configuration of a lead acid battery with absorbed electrolyte.

BACKGROUND

Lead-acid storage batteries are typically formed of several cell elements which are encased in separate compartments of a container with sulfuric acid electrolyte. Each cell element typically includes at least one positive plate, at least one negative plate, and a separator positioned between each positive and negative plate. The positive and negative plates are generally a lead or lead alloy grid that supports an electrochemically active material, and in particular a lead based material (i.e., PbO, $PbO_2$, Pb or $PbSO_4$) pasted onto the grid. The grids provide an electrical contact between the positive and negative active materials which serves to conduct current.

It is known to provide sealed lead-acid batteries of one or more cells operating on the oxygen cycle with internal recombination of oxygen during charge and reasonable overcharge. These starved electrolyte batteries, or absorbed glass mat (AGM) batteries employ an absorptive separator mat preferably of micro-fine glass fibers having a large surface area per unit of volume and a large porosity, enabling retention of the bulk of the acid electrolyte (capacity determining) of the cell in the separator(s) while leaving a sufficiently thin layer of electrolyte on the active plate surface to sustain internal oxygen recombination within the cell at high efficiencies. Unfortunately, AGM batteries are more expensive than a typical flooded-cell type battery. In addition, such AGM batteries utilize expanded metal grids for the battery plates which are concast or book mold cast grids. Such grids, and the plates, cells and batteries made therewith are inefficient. In particular, the use of expanded metal grids results in low efficiency in the use of lead per performance output. Further, these expanded metal grids, when used in combination with stamped or alternative grids, require additional tooling and devices for manufacture, resulting in increased cost.

SUMMARY

Accordingly, a battery plate assembly for a lead-acid battery is provided. The assembly includes a plate of a first polarity formed by an electrically conductive grid body having opposed top and bottom frame elements and opposed first and second side frame elements, the top frame element having a lug and an opposing enlarged conductive section extending toward the bottom frame element; a plurality of interconnecting electrically conductive grid elements defining a grid pattern defining a plurality of open areas, the grid elements including a plurality of radially extending vertical grid wire elements connected to the top frame element, and a plurality of horizontally extending grid wire elements, the grid body having an active material provided thereon. A plate of a second polarity opposite the first polarity is also provided and formed by an electrically conductive grid body having opposed top and bottom frame elements and opposed first and second side frame elements, the top frame element having a lug and an opposing enlarged conductive section extending toward the bottom frame element; a plurality of interconnecting electrically conductive grid elements defining a grid pattern defining a plurality of open areas, the grid elements including a plurality of radially extending vertical grid wire elements connected to the top frame element, and a plurality of horizontally extending grid wire elements, the grid body having an active material provided thereon. A highly absorbent separator is wrapped around at least a portion of the plate of a first polarity and extends to opposing plate face& An electrolyte is provided, wherein substantially all of the electrolyte is absorbed by the separator or active material.

An alternative battery plate assembly is also provided. The assembly includes a plurality of plates of a first polarity formed by a stamped electrically conductive grid body having opposed top and bottom frame elements and opposed first and second side frame elements, the top frame element having a lug and an opposing enlarged conductive section extending toward the bottom frame element; a plurality of interconnecting electrically conductive grid elements defining a grid pattern defining a plurality of open areas, the grid elements including a plurality of radially extending vertical grid wire elements connected to the top frame element, and a plurality of horizontally extending grid wire elements, the grid body having an active material provided thereon. A plurality of plates of a second polarity opposite the first polarity are also provided and formed by a stamped electrically conductive grid body having opposed top and bottom frame elements and opposed first and second side frame elements, the top frame element having a lug and an opposing enlarged conductive section extending toward the bottom frame element; a plurality of interconnecting electrically conductive grid elements defining a grid pattern defining a plurality of open areas, the grid elements including a plurality of radially extending vertical grid wire elements connected to the top frame element, and a plurality of horizontally extending grid wire elements, the grid body having an active material provided thereon. A plurality of highly absorbent separators are also provided. Each highly absorbent separator of the plurality of highly absorbent separators is wrapped around at least a portion of each plate in the plurality of plates of a first polarity such that the separator material is interleaved between adjacent plates. An electrolyte is provided, wherein substantially all of the electrolyte is absorbed by the plurality of highly absorbent separators or active material.

A method of assembling a battery is also provided. The method includes stamping a plurality of grids of a first polarity from a first continuous strip of grid material, the stamped grids including an electrically conductive grid body having opposed top and bottom frame elements and opposed first and second side frame elements, the top frame element having a lug and an opposing enlarged conductive section extending toward the bottom frame element; a plurality of interconnecting electrically conductive grid elements defining a grid pattern defining a plurality of open areas, the grid elements including a plurality of radially extending vertical grid wire elements connected to the top frame element, and a plurality of horizontally extending grid wire elements. The method also includes stamping a plurality of grids of a second polarity opposite the first polarity from a second continuous strip of grid material, the stamped grids including an electrically conductive grid body having opposed top and bottom frame elements and opposed first and second side frame elements, the top frame element having a lug and an opposing enlarged conductive section extending toward the bottom frame element; a plurality of interconnecting electrically conductive grid elements defining a grid pattern defining a plurality of open areas, the grid elements including a plurality of radially extending vertical grid wire elements connected to the top frame element, and a plurality of horizontally extending grid wire elements. A plurality of plates of a first polarity are formed by providing active material to the grids of a first polarity. A plurality of plates of a second polarity are formed by providing active material to the grids of a second polarity. A highly absorbent separator is wrapped around the bottom of each plate of a first polarity from the plurality of plates of a first polarity and extended upwardly along the opposing plate faces of each plate towards the lugs. The plurality of plates of a first polarity and plurality of plates of a second polarity are assembled into a container so as to interleave highly absorbent separator between each plate of a first polarity and each plate of a second polarity. Electrolyte is provided to the container such that substantially all of the electrolyte is absorbed by the plurality of highly absorbent separators or active material. The lugs of the battery plates are coupled together by cast on straps, and the cast on straps are coupled with terminal posts carried by the container.

BRIEF DESCRIPTION OF DRAWINGS

Various examples of embodiments of the systems, devices, and methods according to the present disclosure will be described in detail, with reference to the following figures, wherein.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DETAILED DESCRIPTION

Figures 1, 2:
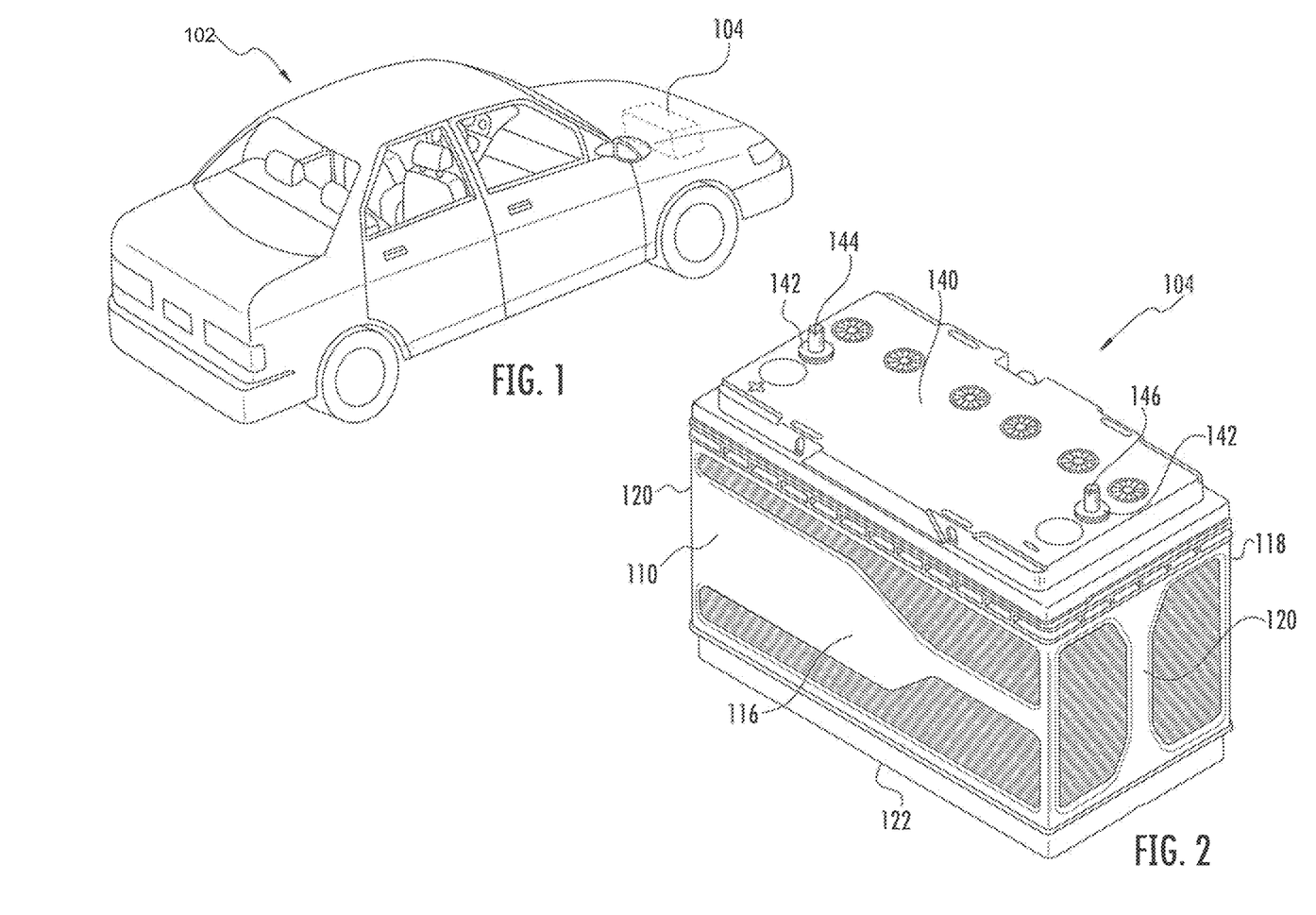
FIG. 1 is an isometric view of a vehicle including a battery according to one or more examples of embodiments.
FIG. 2 is an isometric view of a battery according to one or more examples of embodiments.

Referring to FIG. 1, a vehicle 102 is shown that includes a battery 104 according to one or more examples of embodiments. While the vehicle 102 is shown as an automobile, according to various alternative embodiments, the vehicle 102 may comprise any variety of types of vehicles including, among others, commercial trucks, motorcycles, buses, recreational vehicles, boats, golf cars and carts, lawn and garden vehicles, and the like. According to one or more examples of embodiments, the vehicle 102 uses an internal combustion engine or a combination of an internal combustion engine and battery for locomotive purposes. The battery 104 may also be used for example in high performance engine starting, power sports, deep cycle, solar, storage, and the like.

The battery 104 shown in FIG. 1 is configured to provide at least a portion of the power required to start or operate the vehicle and/or various vehicle systems (e.g., starting, lighting and ignition systems). Further, it should be understood that the battery 104 may be utilized in a variety of applications not involving a vehicle, and all such applications are intended to be within the scope of the present disclosure.

The battery 104 shown in FIG. 1 may include any type of secondary battery (e.g., rechargeable battery). According to one or more examples of embodiments, the battery 104 is a lead-acid storage battery. Lead-acid storage batteries may be either sealed (e.g., non-maintenance) or unsealed (e.g., wet). According to one or more examples of embodiments, the lead-acid storage battery 104 is a sealed lead-acid battery.

Figure 3:
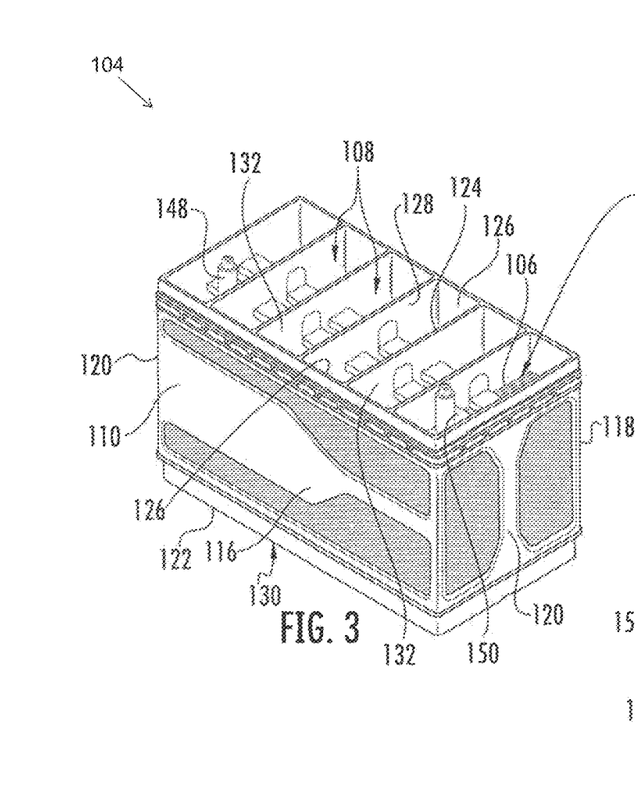
FIG. 3 is an isometric view of the battery shown in FIG. 2 without a cover according to one or more examples of embodiments.

An example of a lead-acid storage battery 104 is illustrated in FIGS. 2-3. Referring to FIG. 3, the lead-acid storage battery 104 includes several cells or cell elements 106 which are provided in separate compartments 108 of a container or housing 110 containing electrolyte. The illustrations provided herein relate to automotive applications, wherein groups of plates 106 are used in each of six stacks for producing a standard automotive 12-volt battery. As shown in the illustrated example of FIGS. 3-8, a plurality of plates 112, 114 (positive and negative) may be provided in a group 106. FIGS. 4-8 illustrate seventeen plates (e.g. nine negative plates and eight positive plates) in a group. However, it will be obvious to those skilled in the art after reading this specification that the size and number of the individual grids, the size and number of plates in any particular stack or group, and the number of stacks or groups used to construct the battery 104 may vary widely depending upon the desired end use.

The battery housing 110 includes a box-like base or container 110 and is made of a moldable resin. The container or housing 110 includes a front wall 116, a rear wall 118, side walls 120 and a bottom wall 122. The battery compartment 108 also includes a front wall 124, end walls 126, a rear wall 128 and a bottom wall 130. In the example described herein, five cell partitions or dividers 132 are provided between the side walls 120, resulting in the formation of six compartments 108 (see FIG. 3), as may be present in a 12-volt automotive battery. A plurality of plate blocks 106 are connected in series according to the capacity of the lead storage battery 104 and are accommodated in the battery container or housing 110 together with the electrolyte, which is most commonly aqueous sulfuric acid. In various embodiments, a cell or plate block 106 is located in each compartment 108. Each plate block 106 includes one or more positive and negative plates 112, 114, each having at least one lug 134, 136, and separator material 138 placed between each positive and negative plate.

As shown in FIG. 2, a cover 140 is provided for the housing 110, and in various embodiments, the cover 140 includes terminal bushings 142 and fill tubes to allow electrolyte to be added to the cells and to permit servicing. To help permit exhausting of gases generated during the electrochemical reaction, a battery 104 may also include one or more vent cap assemblies.

One or more positive terminal posts 144 and one or more negative terminal posts 146 may be found on or about the top 140 or front 116 of the battery 104. Such terminal posts 144, 146 typically include portions which may extend through the cover 140 and/or the front 116 of the battery housing 110, depending upon the battery design. In various embodiments, the terminal posts 144, 146 may also extend through a terminal post seal assembly to help prevent leakage of acid. It will be recognized that a variety of terminal arrangements are possible, including top, side or corner configurations known in the art. Each terminal post 144, 146 may be coupled to a cast-on strap(s) 148, 150 or a connecting strap(s) that couple common polarity plates via extended lugs 134, 136 or tabs in each cell.

Figure 4:
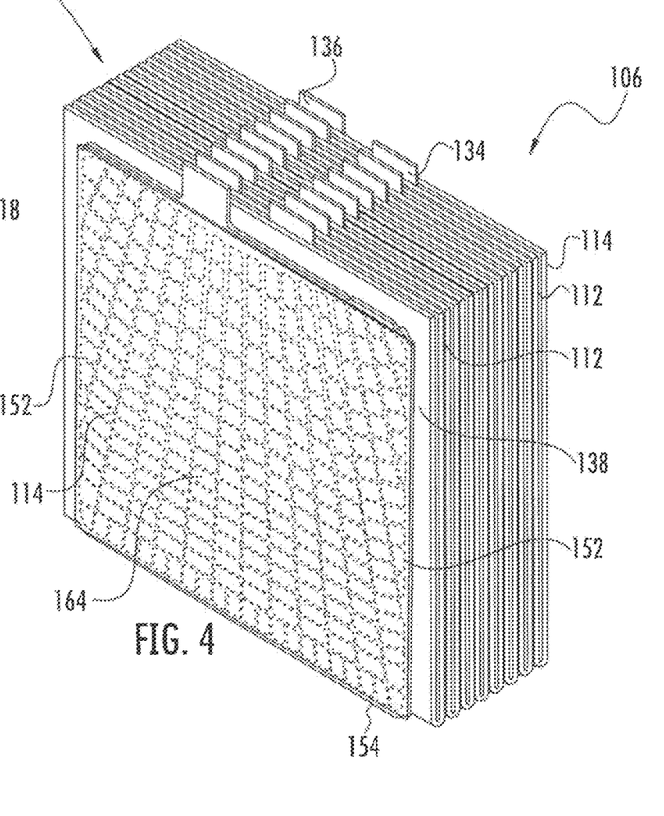
FIG. 4 is an isometric view of a cell including positive and negative plates and separators from the battery shown in FIG. 3 according to one or more examples of embodiments.
Figure 5:
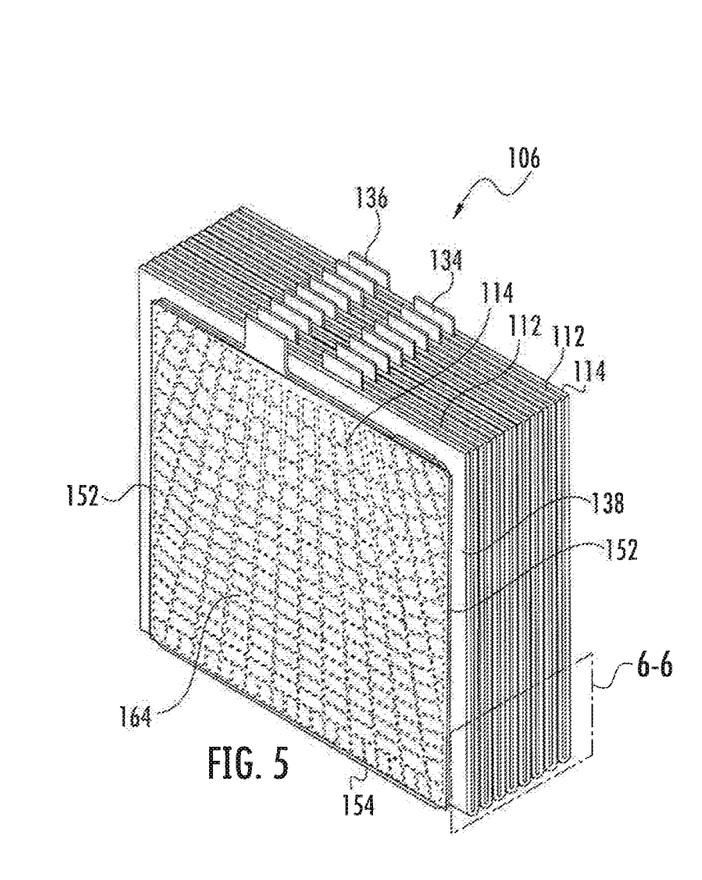
FIG. 5 is an isometric view of a cell including positive and negative plates and separators from the battery shown in FIG. 3 according to one or more examples of embodiments.
Figure 6:
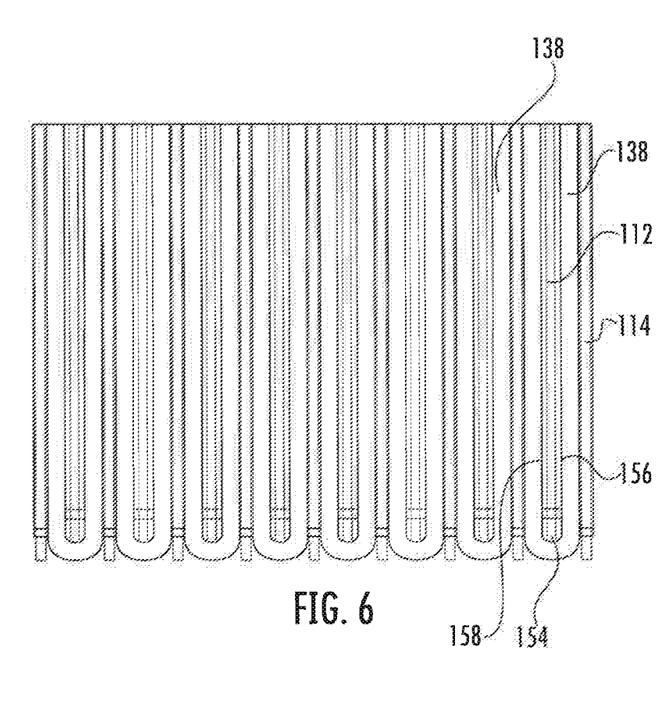
FIG. 6 is a detailed partial side elevation view of the cell from the battery shown in FIG. 3 taken from segment 6-6 of FIG. 5 according to one or more examples of embodiments.
Figure 7:
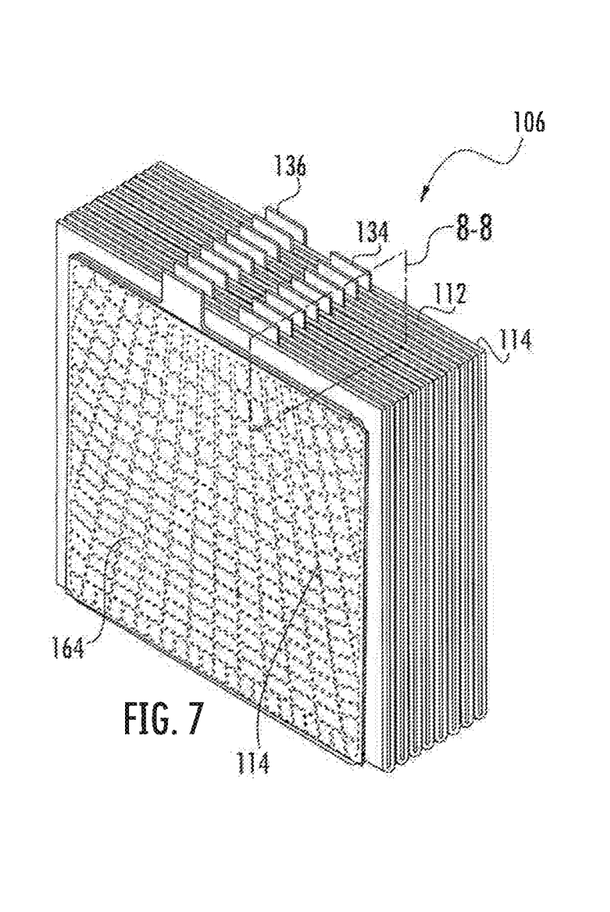
FIG. 7 is an isometric view of a cell including positive and negative plates and separators from the battery shown in FIG. 3 according to one or more examples of embodiments.
Figure 8:
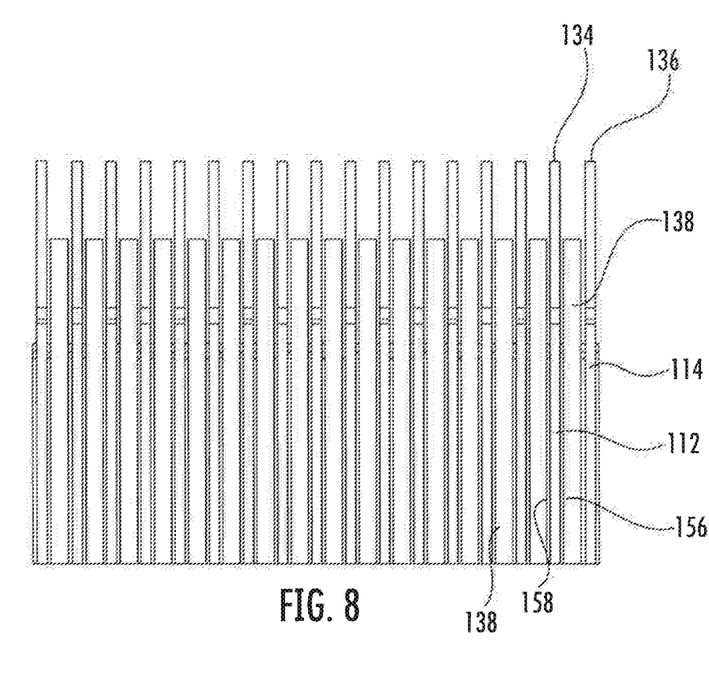
FIG. 8 is a detailed partial cross-sectional view of the cell from the battery shown in FIG. 3 taken from segment 8-8 of FIG. 7 according to one or more examples of embodiments.
Figure 9:
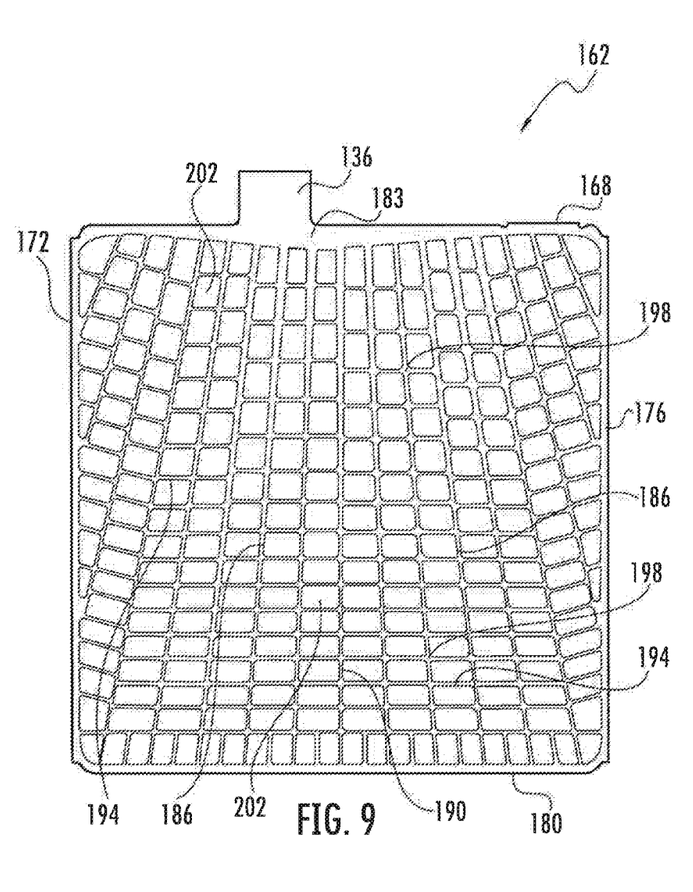
FIG. 9 is a plan view of a negative grid according to one or more examples of embodiments for use with the cell shown in FIG. 4.
Figure 10:
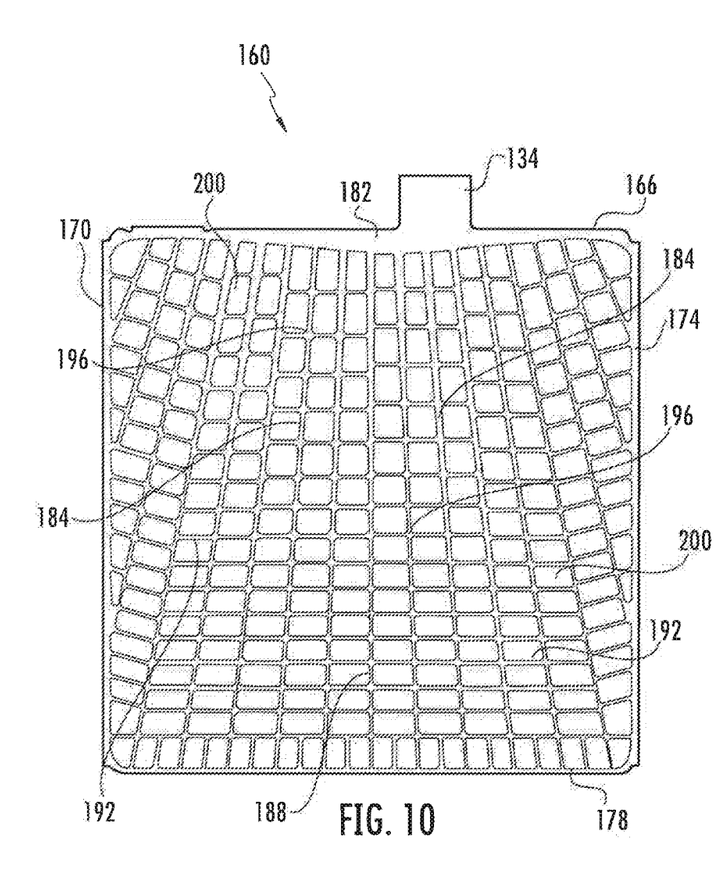
FIG. 10 is a plan view of a positive grid according to one or more examples of embodiments for use with the cell shown in FIG. 4.
Figures 11, 13:
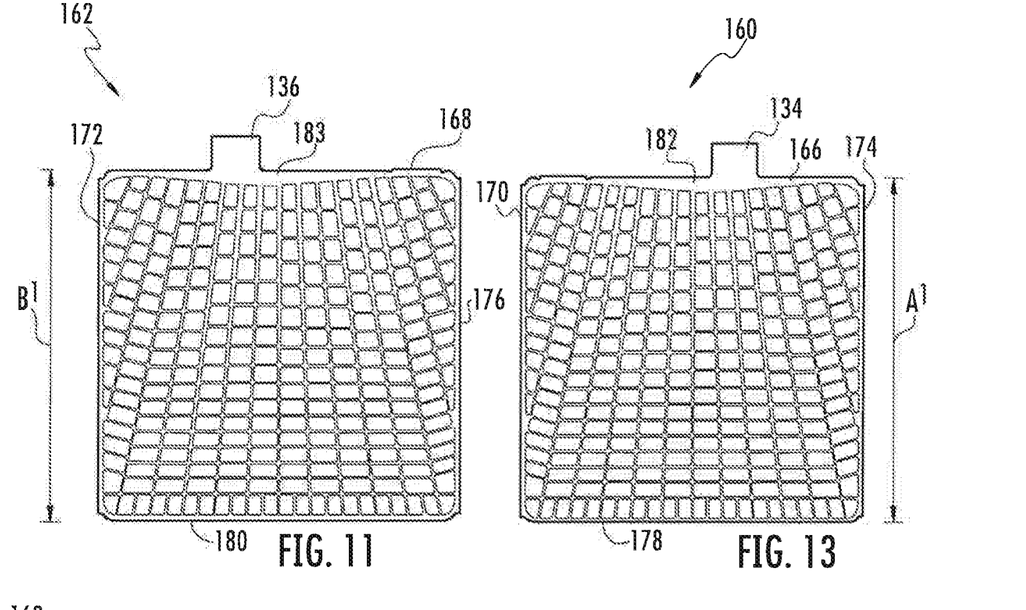
FIG. 11 is a plan view of a negative grid according to one or more examples of embodiments for use with the cell shown in FIG. 4, showing the length or height of the negative grid and bottom frame element.
FIG. 13 is a plan view of a positive grid according to one or more examples of embodiments for use with the cell shown in FIG. 4, showing the length or height of the positive grid and bottom frame element.
Figures 12, 14:
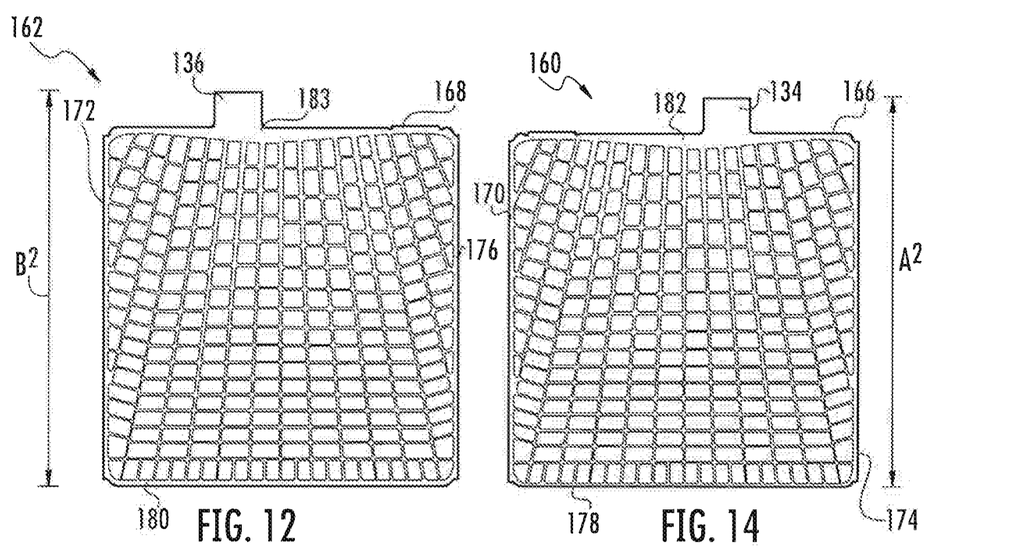
FIG. 12 is a plan view of a negative grid according to one or more examples of embodiments for use with the cell shown in FIG. 4, showing the length and height of the negative grid and lug.
FIG. 14 is a plan view of a positive grid according to one or more examples of embodiments for use with the cell shown in FIG. 4, showing the length or height of the positive grid and lug.
Figure 15:
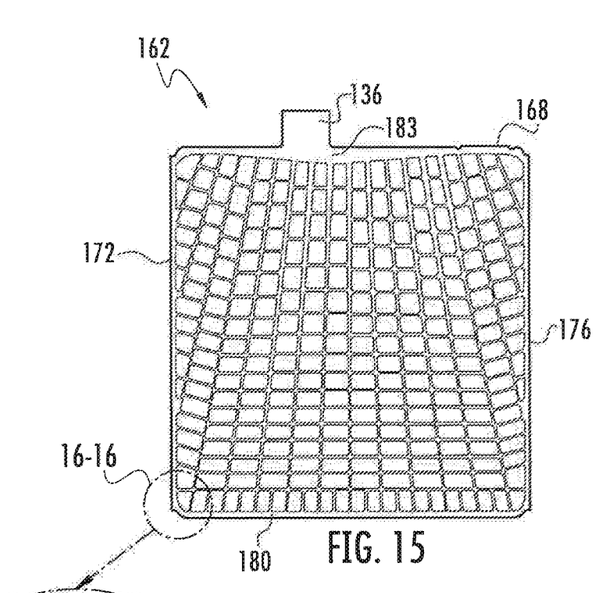
FIG. 15 is a plan view of a negative grid according to one or more examples of embodiments for use with the cell shown in FIG. 4.
Figure 16:
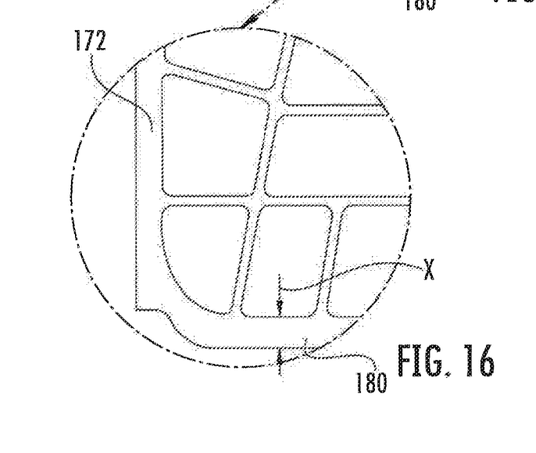
FIG. 16 is a detailed partial cut-away view of the negative grid for use with the cell shown in FIG. 4, taken from segment 16-16 of FIG. 15 according to one or more examples of embodiments.
Figure 17:
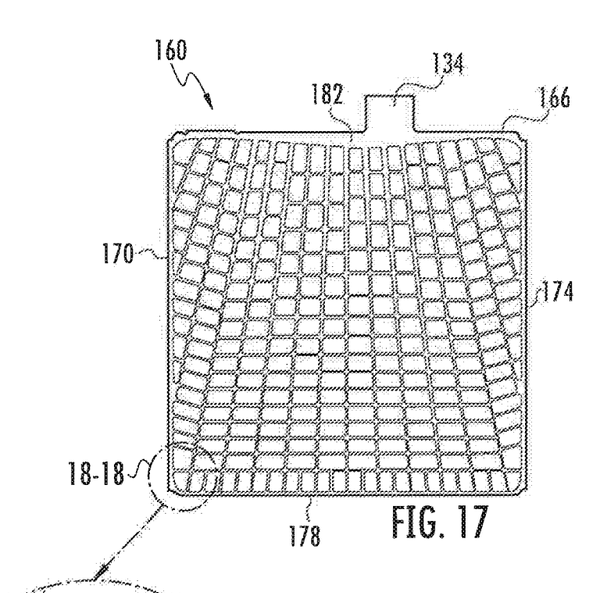
FIG. 17 is a plan view of a positive grid according to one or more examples of embodiments for use with the cell shown in FIG. 4.
Figure 18:
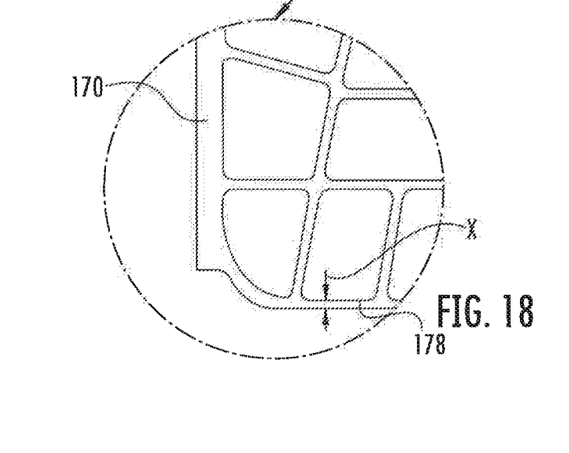
FIG. 18 is a detailed partial cut-away view of the positive grid for use with the cell shown in FIG. 4, taken from segment 18-18 of FIG. 17 according to one or more examples of embodiments.

As indicated, each cell element or chapter 106 includes one or more positive plates 112, one or more negative plates 114, and a separator 138 positioned between each positive and negative plate. Positive and negative electrode plates 112, 114 can be classified into various types according to the method of manufacturing the same. As one example, a cell 106 including paste-type electrodes 112, 114 is shown in FIGS. 4-8. The paste-type electrode may include a grid substrate and an electrochemically active material or "paste" provided on the substrate. The grid may be formed of a soft alloy. As can be seen in FIG. 4, each plate 112, 114 may have a generally rectangular shape and includes a lug 134 or 136 which, in the assembled battery 104, is electrically coupled to a battery terminal 144 or 146 using, for example a cast-on strap 148 or 150. The plate 112, 114 also includes side walls 152, a bottom edge 154, and opposing faces 156, 158.

As discussed above, the positive and negative plates 112, 114 each comprise a lead or lead alloy grid 160, 162 that supports an electrochemically active material 164. The grids 160, 162 generally provide an electrical contact between the positive and negative active materials or paste 164 which serves to conduct current. The grids 160, 162 may also serve as a substrate for helping support electrochemically active material (e.g., paste) deposited or otherwise provided thereon during manufacture to form battery plates.

As set forth in greater detail below, known arts of lead acid battery grid making include: (1) batch processes such as book mold gravity casting; and (2) continuous processes such as strip expansion, strip stamping, continuous casting, and continuous casting followed by rolling. Grids made from these processes tend to have unique features characteristic of the particular process and behave differently in lead acid batteries, especially with respect to the pasting process.

The grid or grids 160, 162 described herein are stamped grids. FIGS. 9-18 illustrate one or more examples of embodiments of a stamped grid or grids 160, 162, including grids for a positive plate 112 (e.g., FIG. 10) and a negative plate 114 (e.g., FIG. 9), one or more of which may be provided with or include active material or paste (generally designated by reference number 164) thereon. The examples shown in the Figures include both a positive plate 112 and a negative plate 114 (see FIGS. 4-8), as well as a positive grid 160 (e.g., FIG. 10) and a negative grid 162 (e.g., FIG. 9). The stamped grid 160, 162 is an electrically conductive grid body that has a frame which includes a top frame element 166, 168, first side frame element 170, 172 and second side frame element 174, 176, and a bottom frame element 178, 180. In various embodiments, the stamped grid 160, 162 includes a series of electrically conductive grid wires 184, 186, 188, 190, 192, 194 which define a grid pattern including open areas that help hold the active material or paste 164 which helps provides current generation. In various embodiments, a current collection lug 134, 136 is integral with the top frame element 166, 168. While FIGS. 9-18 depict the lug 134, 136 as offset from the center of the top frame element 166, 168, the lug 134, 136 may alternatively be centered or positioned closer to either the first or second side frame elements 170, 174 or 172, 176. The top frame element 166, 168 may include an enlarged conductive section 182, 183 at least a portion of which is directly beneath the lug 134, 136 to optimize current conduction to the lug. The enlarged conductive section 182, 183 extends toward the bottom frame element 178, 180. The bottom frame element 178, 180 may be formed with one or more downwardly extending feet (not shown) for spacing the remainder of the grid away from the bottom of the battery container 110.

A series or plurality of radially extending vertical grid wires 184, 186 or elements form part of the grid 160, 162. Vertical wire elements 184, 186 are connected to the top frame element 166, 168 and the bottom frame element 178, 180. One or more vertical wire elements 184, 186 are also connected to the top frame element 166, 168 and the first side frame element 170, 172 or the second side frame element 174, 176. Vertical wire element 188, 190 is parallel to the side frame elements 170, 172, 174, 176. The remaining vertical wire elements 184, 186 extend radially from an imaginary intersecting point along a radius line running through the vertical elements. The vertical wire elements 184, 186 become closer together when moving from the bottom frame element 178, 180 to the top frame element 166, 168 and get further apart when moving to the first side frame element 170, 172 or the second side frame element 174, 176 from the vertical element 188, 190.

The grid 160, 162 also includes a plurality of horizontal or cross wire elements 192, 194. To assist in supporting the electrochemical paste 164 and/or permit the formation of paste pellets, in various examples of embodiments, the stamped grid includes horizontal wires 192, 194 which may be equally spaced apart and are parallel to the top and/or bottom frame elements 166, 168, 178, 180. As shown in FIGS. 9-20, however, at least some of the horizontal wires 192, 194 may not be equally spaced apart or parallel to the top and/or bottom frame elements.

Individual sections of the vertical wire elements 184, 186, 188, 190 and the horizontal wire elements or the cross wire elements 192, 194 have opposed ends which are joined at a plurality of nodes 196, 198 but define the open areas 200, 202 that support the electrochemical paste 164 for conduction.

In various examples of embodiments, at least some of the grid wires increase in cross-sectional area along their length from bottom to top or have a tapered shape so as to optimize the current carrying capacity of the wires to help carry away increasing current being generated from the bottom to the top. The width and spacing of the wires between side elements may be predetermined so that there are substantially equal potential points across the width of the grid.

The cross-section of the grid wires may vary depending upon the grid making process. To help improve adhesion of the battery paste 164, however, in various embodiments, the grid wires may be mechanically reshaped or refinished. It should be appreciated that any number of grid wire shapes may be utilized as long as the shape provides suitable paste adhesion characteristics. For example, the cross section of wires may be of any cross-section design including substantially oval shaped, substantially rectangular, substantially diamond shape, substantially rhomboid shape, substantially hexagon shape, and/or substantially octagon shape.

In the battery grid 160, 162, each grid wire section may have a different cross-sectional configuration, or each grid wire section may have the same or a similar cross-sectional configuration. Depending on the needs, a grid can be deformed at the vertical wire elements only, the horizontal wire elements only, or at both the vertical and horizontal wire elements.

Various grid designs (e.g. stamped grid designs) may be utilized. See, e.g., U.S. Pat. Nos. 5,582,936; 5,989,749; 6,203,948; 6,274,274; 6,921,611; 6,953,641; 7,398,581; 7,763,084; 7,767,347; 7,799,463; and U.S. patent application Ser. Nos. 10/819,485; 12/529,599; and 60/904,404, each of which are incorporated herein by reference in their entireties. Suitable stamped grids include PowerFrame® stamped grids (available from Johnson Controls, Inc., Milwaukee, Wis.) as the positive grids and the negative grids. It should be noted that an infinite number of grid designs may be utilized and therefore, it is not the intent of the description herein to limit the invention to the grid design shown in FIGS. 9-18, which are presented for the purposes of illustration.

Various chemistries in which the electrochemical potential between various materials is used to generate electricity have been studied and commercially implemented. See, in general: Besenhard, J. O., Ed., *Handbook of Battery Materials*, Wiley-VCH Verlag GmbH, Weinheim, Germany, 1999; and Linden, D., Ed., *Handbook of Batteries*, Second Edition, McGraw Hill Inc., New York, N.Y., 199, both of which are incorporated herein by reference.

The active material or paste 164 deposited on the grid is typically a lead-based material (e.g. PbO, $PbO_2$, Pb or $PbSO_4$ at different charge/discharge stages of the battery) that is pasted, deposited or otherwise provided onto the grids 160, 162. The paste 164 composition may be determined by power requirements, cost and battery environment, as it is known in the art. In various embodiments, the active material 164 of a lead-acid battery 104 is prepared by mixing lead oxide, sulfuric acid and water. The lead oxide reacts with the sulfuric acid to form mono-, tri- and/or tetrabasic lead sulfate(s). Dry additives, such as fiber and expander, may also be added to the active material 164. For example, in various embodiments, expanders such as finely-divided carbons (e.g. lampblack or carbon black), barium sulfate and various lignins may be included in the active material 164. In various embodiments, the mixture is then dried and water is re-added to form a paste 164 of the desired consistency.

The active material or paste 164 provided on the negative grid 162 is similar in type to the active material 164 provided on the positive grid 160. However, it is contemplated there may be differences in the active material 164 depending upon the polarity of the grids for which it is intended to be provided. For example, the active material 164 provided on the positive grid 160 (e.g. lead dioxide [$PbO_2$]), may be provided in micro-particle form, so that the electrolyte is allowed to diffuse and permeate through the lead dioxide micro-particles on the positive electrode plate 112. The active material 164 of the negative grid 162 may be porous and reactive, so that the electrolyte is allowed to diffuse and permeate through the lead on the negative electrode plate 114. While specific examples are provided, variations thereon would not depart from the overall scope of the present invention.

To prevent the separation of the active materials 164 from the grids 160, 162 and to ensure easy handling of the active materials 164 in the manufacture of electrodes 112, 114, a pasting paper (not shown) may be adhered or otherwise provided on at least one of the surfaces of the active material 164 as a support to the active material after deposition on the grids. Porous nonwoven fabric (e.g. having micron-sized pores), instead of paper, may alternatively be provided into the surface or on the active material 164 to prevent the separation and handling problems of the active material 164 and initial high rate discharge degradation. For example, a nonwoven fabric synthesized from thermoplastic resin by spun-bonding or thermal-bonding may be used. In various embodiments, nonwoven fabric formed of one or more polyesters, polypropylenes, or viscose rayon may be used.

In various examples of embodiments, one or more battery separators 138 are used to conductively separate the positive electrodes 112 and negative electrodes 114. A separator material 138, utilized to separate adjacent plates 112, 114 from one another, has sufficient porosity and retention to contain substantially all of the electrolyte necessary to support the electrochemical reactions. In various examples of embodiments, the separator material 138 is compressible so that upon stacking of the elements, the separator material substantially conforms to the contour of the surface of the plates 112, 114 to help it perform its wicking or capillary action.

The separator 138 of one or more examples of embodiments is a highly porous mat of ultrafine glass fibers and has properties for use in sealed lead-acid batteries operating on the oxygen recombination principle. The separator 138 described herein is adapted to provide for hydrogen and oxygen recombination inside the battery 104, and may include gas phase transfer of oxygen to the negative plates 114 to enable recombination back into water with charging. Generally, the separator 138 or mat is formed of a material that allows the electrolyte to be suspended in close proximity with the plates' active material 164 and may absorb electrolyte through capillary action. In various examples of embodiments, the separator 138 is constructed of absorbent glass mat (AGM). The mat 138 preferably includes a polymeric component, such as polypropylene and/or polyethylene. In various examples of embodiments, the AGM or separator 138 is non-woven or a non-woven fabric, and includes glass micro-fibers which may retain electrolyte (e.g. by capillary action) and provide gas spaces when the grid is not fully saturated with electrolyte. In this regard, the electrolyte may be free to move but is more confined than in a flooded cell. Other known and later developed separator materials may also or alternatively be used in connection with the cell including, without limitation, micro-porous rubber, polyvinyl chloride, polyolefin and phenolic resin impregnated paper.

As shown in FIGS. 5-8, in various embodiments, separator 138 may be placed on the plate and/or between the plates 112, 114. Separators 138 may be provided between the plates 112, 114 to prevent shorting and/or undesirable electron flow produced during the reaction occurring in the battery 104. In one or more examples of embodiments, the separator material 138 may be wrapped under and/or around certain plates 112 or 114 (e.g. plates of a similar polarity). In the illustrated examples, separator material 138 is wrapped or partially wrapped around the positive plate(s) 112 or a portion thereof, although the separator 138 may be wrapped or partially wrapped around the negative plate(s) 114 or a portion thereof without departing from the overall scope of the present invention. For example, separator material 138 may be wrapped around the bottom edge 154 of a plate 112 and extend upwardly along the opposing plate faces 156, 158 towards the lug 134 to substantially or partially separate the plate 112 from adjoining plates 114, such as plates of opposite polarity 112 and 114.

In each cell, it is preferable that there is essentially no or very little free electrolyte except that retained within the separator material 138 or in any pores of the plates 112, 114. However, it is contemplated that not all of the electrolyte will be absorbed by the separator 138 and thus some free electrolyte will or may exist in the cell. In various embodiments, the separator material 138 surrounds an edge 154 (e.g. the edge formed in part by the lower frame element) of one or more plates and may contact at least one interior surface of the container 110.

The thickness of a separator 138 will vary depending upon the type of battery 104 in which it is used. In various embodiments, the thickness of the separator 138 may range from 0.01 millimeters to 2.00 millimeter or more is approximately 1.65 millimeters (0.065 inches).

In one or more alternative examples of embodiments, the grids 162 of the plates 114 adjoining the plates 112 wrapped with separator material 138 are longer or taller than the grids 160 of the plates 112 wrapped with separator material 138 (see FIGS. 5-8 and 11-18). As a result, the lugs 136 of the plates adjoining the plates wrapped with separator material 138 (i.e., those plates that are not wrapped) are at a substantially similar or uniform height to the lugs 134 of the plates wrapped with separator material 138. The substantially uniform lug height may be achieved through a variety of ways. For example, as shown in FIGS. 9-18, the margin (X) (see FIGS. 16, 18) of the bottom frame element 180 of one or more grids 162 of the plates 114 adjoining a plate 112 wrapped with a separator 138 (e.g. one or more negative plates) may be made relatively thicker than the bottom frame element 178 of the grid 160 for plate 112 wrapped with the separator 138 providing a plate height such that lug height of plates 112 wrapped with a separator 138 is substantially the same as the lug height of plates 114 that are not wrapped with a separator 138. In this regard, the grids may be provided with the following ratios (referring to FIGS. 11-14):

plate height ($A^1$)<plate height ($B^1$)
lug height ($A^2$)<lug height ($B^2$); but
lug height ($A^2$)+separator thickness=lug height ($B^2$)

In various embodiments, and as shown in FIGS. 5-8, the increase in relative thickness is substantially equal to the thickness of the separator material 138. In various embodiments, and as shown in FIGS. 11-18, the thickness of the bottom frame element 180 of one or more grids 162 of the plates 114 adjoining a plate 112 wrapped with a separator 138 (e.g. one or more negative grids) may be between approximately 1.25 millimeters and 1.75 millimeters thicker than the bottom frame element 178 of the grids 160 for plates 112 wrapped with the separator 138. In the illustrated example, the positive grid 160 and plate 112 are shown with separator 138 wrapped thereon for ease of reference and understanding, but alternatively the negative grid 162 and plate 114 may have the separator 138 thereon as noted herein.

A plate 112, 114 for a lead-acid battery 104 is made by applying active material or paste 164 to a conductive support such as a lead alloy grid 160, 162. Plates can be classified according to the method of manufacturing the same. The grids 160, 162 may be produced using various known or later-developed processes. For example, as discussed above, the substrate 160, 162 may be formed by a casting process (e.g. by pouring a melted alloy into a mold), a stamping process, or by continuous rolling. In the method of assembling a battery 104 according to one or more examples of embodiments described herein, a plurality of positive grids 160 having the grid pattern described herein are formed by stamping the plurality of grids from a rolled wrought strip of grid material. A plurality of negative grids 162 having the grid pattern described herein are also formed by stamping the plurality of grids from a rolled wrought strip of grid material. During the manufacture of the grids 160, 162 or the plates 112, 114, the grid wires may be refinished or reshaped.

The active material or paste 164 is then applied to, deposited on or otherwise provided (e.g. pasted by a conventional paster) on the grid 160, 162 to form the plates 112, 114. The paste 164 may be applied such that paste 164 may be provided on substantially all of the grid, including the edges or margins, filling the holes therein as well as forming a coat on each face or side. Alternatively, the marginal edges and the lugs 134, 136 are substantially free from paste 164. In various embodiments, one or more pasting materials or pasting papers are provided on one or both surfaces of the active material 164. In various embodiments, the pasting materials or paper may be provided in a continuous process.

In various examples of embodiments, the grids 160, 162, active material 164 and pasting material or paper are fed to a divider where the strip is cut into plates 112, 114. Plates cut from the strip may be flattened or otherwise modified to help smooth out any uneven regions of paste.

Groupings of individual battery plates 112 or 114 may be assembled, enveloped, interleaved or otherwise separated with separator material 138, and provided together to form plate sets 106. For example, unformed plates 112, 114 may be assembled with interleaved highly absorbent separators 138 or AGM separator material, pressed to a desired pressure, if necessary, and inserted into the container 110 with the plates and separators 138 existing under mutual compression. In various examples of embodiments, the AGM material or separator 138 is wrapped around a plate 112 or 114 as shown in FIGS. 4-8. For example, the AGM material may be wrapped around the bottom edge 154 of each positive plate 112 and extend upwardly along the opposing plate faces 156, 158 of each positive plate 112 towards the lugs 134. The AGM material 138 may cover a portion of the plate 112 or a substantial portion of the plate.

During assembly, the positive lugs 134 of the battery plates 112 are coupled together and the negative lugs 136 of the battery plates 114 are coupled together. This may be accomplished using cast-on straps 148, 150 formed by taking assembled battery stacks 106, inverting them, and dipping the lugs 134, 136 into molten lead provided in a mold. To permit current to follow throughout the battery 104, cast-on straps 148 or 150 of stacks 106 are joined or coupled. Moreover, terminal electrodes or posts 144, 146 are provided which extend through the cover 140 or housing 110 or into bushings 142 or the like in the cover 140 or housing 110 to permit electrical contact with a vehicle's electrical system or other system requiring or intended to use battery power. The cast-on straps 148 or 150 are coupled to the respective terminal posts 144 or 146.

In various embodiments, the battery housing 110, including the cover 140, is provided containing the battery cells in which the various plate groupings 106 with separator 138 are added to the individual compartments 108 of the container 110. In various embodiments, electrolyte is then added to the battery cells. The electrolyte is provided in a controlled quantity so that the electrolyte is substantially, fully absorbed in the pores of the plates 12, 114 and the separator 138. Any residual electrolyte fluid coating, dust, and other debris may be washed away to prepare the battery 104 for shipment.

Following the initial wash, the batteries are electrochemically formed by passage of current through the battery 104, and in particular the cells and electrodes, for example to convert the lead sulfate or basic lead sulfate(s) to lead dioxide (positive plates) or lead (negative plates). This is referred to as the "formation" process. Formation may occur prior to sealing the cover 140 to the container 110 or after sealing.

The battery, plates, grids, and separator provided herein provide various advantages over traditional devices. The battery described herein also provides a high specific power or power density and have a low internal resistance which allows for rapid charge and discharge. The battery, plates, grids and separator provided herein for use with absorbent mat batteries provide more efficient use of lead per performance output. In addition, the battery may include purer lead in the plates as each plate does not need to support its own weight and the plates are resistant to vibration due to the sandwich construction caused by the use of AGM matting. Further, the battery, including the absorbent matting, retains fluid, reducing the likelihood of a spill of electrolyte from the battery and conserving water. Moreover, the suspension of electrolyte in close proximity with the plates' active material enhances both the discharge and recharge efficiency of the battery.

Use of the same form of grid, i.e. a stamped grid, or the use of a stamped rolled wrought strip for making the grids for an absorbent mat battery reduces costs (e.g., tooling costs, among other costs), as it permits shared tooling for positive and negative plates in, for example, an AGM battery, and eliminates the need for concast or book mold cast grids.

The secondary absorbent glass mat (AGM) battery, or the like, of a type disclosed in the present application includes one or more stamped grids described herein as the positive grids and the negative grids which improve current flow, performance, life and/or corrosion capabilities of the battery. The use of one or more stamped grids described herein as the positive grids and the negative grids also reduces the weight and/or the amount of conductive material (e.g. lead) in the battery, improves the rigidity and reduces shorting of the grids in the battery. In addition, the use of one or more stamped grids described herein as the positive grids and the negative grids eliminates expanded metal and/or cast grids from the manufacturing process, thereby improving manufacturing processes and reducing material and/or manufacturing costs (e.g. by allowing the use of the same stamping equipment, such as with only small changes or modifications to the equipment) to manufacture both positive and negative grids. Moreover, the use of one or more stamped grids described herein that are extended (e.g. in height) relative or compared to at least one corresponding opposite polarity stamped grid helps maintain a substantially relative uniform lug height between positive and negative plates or electrodes including such stamped grids.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the battery or electrodes or separator as shown and described in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

What is claimed is:

1. A battery plate assembly comprising:
    a plurality of plates of a first polarity formed by an electrically conductive grid body having opposed top and bottom frame elements and opposed first and second side frame elements, the top frame elements each having a first lug, the frame elements defining the perimeter of a plurality of interconnected grid elements forming a grid pattern having a plurality of open areas, the grid elements including a plurality of radially extending vertical grid wire elements connected to the top frame element, and a plurality of horizontally extending grid wire elements;
    a plurality of plates of a second polarity opposite the first polarity and formed by an electrically conductive grid body having opposed top and bottom frame elements and opposed first and second side frame elements, the top frame elements each having a second lug, the frame elements defining the perimeter of a plurality of interconnected grid elements forming a grid pattern having a plurality of open areas, the grid elements including a plurality of radially extending vertical grid wire elements connected to the top frame element, and a plurality of horizontally extending grid wire elements;
    a plurality of highly absorbent separators, each highly absorbent separator of the plurality of highly absorbent separators being interleaved between one or more adjacent plates and at least one of the plurality of highly absorbent separators has a thickness between .01 mm to 2 mm; and
    an electrolyte, wherein the electrolyte is absorbed by the plurality of highly absorbent separators or active material, wherein each highly absorbent separator of the plurality of highly absorbent separators is wrapped around the bottom frame element of each plate in the plurality of plates of a first polarity, respectively, such that the separator extends upwardly along the opposing plate faces toward the lugs, and wherein each of the lugs of the plates of a second polarity is at a substantially uniform height with each of the lugs of the plates of a first polarity wrapped with the separator.

2. The battery plate assembly of claim 1, wherein the plates of a first polarity are positive plates.

3. The battery plate assembly of claim 1, wherein the highly absorbent separator is an absorbent glass mat.

4. The battery plate assembly of claim 1, wherein the plates of a first polarity and plates of a second polarity are formed of lead.

5. A battery comprising the battery plate assembly of claim 1.

6. The battery plate assembly of claim 1, wherein a height of the plates of the first polarity differs from a height of the plates of a second polarity.

7. The battery plate assembly of claim 6, wherein the bottom frame elements of the plurality of plates of a first polarity have a first margin, the bottom frame elements of the plurality of plates of a second polarity have a second margin, and the first margin and the second margin are different.

* * * * *

UNITED STATES PATENT AND TRADEMARK OFFICE
CERTIFICATE OF CORRECTION

PATENT NO. : 10,985,380 B2
APPLICATION NO. : 15/661741
DATED : April 20, 2021
INVENTOR(S) : Mack et al.

It is certified that error appears in the above-identified patent and that said Letters Patent is hereby corrected as shown below:

On the Title Page

Item (57), under "ABSTRACT", in Column 2, Line 11, delete "grid," and insert -- grid --, therefor.

On Page 2, in the continued text of item (63), under "Related U.S. Application Data," in Column 1, Line 3, delete "continuation-in-part" and insert -- continuation --, therefor.

In the Specification

In Column 2, Line 34, delete "face& An" and insert -- face. An --, therefor.

In Column 4, Line 46, delete "embodiments;" and insert -- embodiments. --, therefor.

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*